United States Patent
Neeld (10) Patent No.: US 10,088,226 B2
(45) Date of Patent: Oct. 2, 2018

(54) AUTOMATIC SHUTDOWN SYSTEMS FOR REFRIGERATED CARGO CONTAINERS

(71) Applicant: DoubleDay Acquisitions LLC, Dayton, OH (US)

(72) Inventor: Jonathan Peter Neeld, Centerville, OH (US)

(73) Assignee: DoubleDay Acquisitions LLC, Dayton, OH (US)

(*) Notice: Subject to any disclaimer, the term of this patent is extended or adjusted under 35 U.S.C. 154(b) by 681 days.

(21) Appl. No.: 13/907,169

(22) Filed: May 31, 2013

(65) Prior Publication Data

US 2013/0319020 A1 Dec. 5, 2013

Related U.S. Application Data (60) Provisional application No. 61/653,702, filed on May 31, 2012.

(51) Int. Cl.
- *F25D 11/00* (2006.01)
- *F25D 29/00* (2006.01)
- *B64D 13/00* (2006.01)

(52) U.S. Cl.
CPC ............ F25D 29/00 (2013.01); F25D 11/003 (2013.01); *B64D 13/00* (2013.01)

(58) Field of Classification Search
CPC ...... F25D 11/003; F25D 17/06; F25D 29/003; F25D 29/005; F25D 29/006; F25D 29/008
USPC .................................. 62/125, 126, 127, 371
See application file for complete search history.

(56) References Cited

U.S. PATENT DOCUMENTS

| | | | | |
|---|---|---|---|---|
| 2,449,800 A | * | 9/1948 | Ayers | F25D 29/005 62/214 |
| 2,499,736 A | * | 3/1950 | Kleen | B64D 13/08 165/10 |
| 2,694,537 A | * | 11/1954 | Reichert | B64D 13/08 244/118.5 |
| 4,399,665 A | * | 8/1983 | Evans | B64D 13/08 244/118.5 |
| 5,058,390 A | * | 10/1991 | Sindermann | B64D 13/00 62/181 |
| 6,281,797 B1 | * | 8/2001 | Forster | G01S 5/0018 340/438 |
| 6,483,434 B1 | * | 11/2002 | UmiKer | B65D 25/205 340/5.92 |

(Continued)

FOREIGN PATENT DOCUMENTS

| | | |
|---|---|---|
| EP | 0 457 431 | 11/1991 |
| JP | H08-21678 A | 1/1996 |

(Continued)

OTHER PUBLICATIONS

International Search Report and Written Opinion dated Oct. 2, 2013 for Application No. PCT/US2013/043673.

(Continued)

*Primary Examiner* — Len Tran
*Assistant Examiner* — Eric Ruppert
(74) *Attorney, Agent, or Firm* — Frost Brown Todd, LLC (57) ABSTRACT

Automatic shutdown systems are used with refrigerated air cargo containers. When a fire signature is detected by one or more sensors, the container exhaust fan(s) are automatically shut down or their external airflow is automatically restricted. In addition, or in the alternative, the shutdown system may likewise act when air transit is detected, such as acceleration and/or a change in altitude.

16 Claims, 7 Drawing Sheets

(56) References Cited

U.S. PATENT DOCUMENTS

| | | | |
|---|---|---|---|
| 6,740,381 B2 | 5/2004 | Day et al. | |
| 7,263,855 B2 | 9/2007 | Meyer et al. | |
| 7,501,944 B2 | 3/2009 | Hyde | |
| 7,913,511 B2 | 3/2011 | Meyer et al. | |
| 8,248,253 B2 | 8/2012 | Ankara | |
| 2002/0066284 A1* | 6/2002 | Lindsey | B64D 9/00 62/406 |
| 2004/0113783 A1 | 6/2004 | Yagesh | |
| 2004/0226309 A1 | 11/2004 | Broussard | |
| 2006/0277938 A1* | 12/2006 | Meyer | F25D 11/003 62/371 |
| 2007/0289976 A1* | 12/2007 | Meyer | F25D 11/003 220/592.09 |
| 2009/0212047 A1* | 8/2009 | Harman | B65D 88/14 220/1.5 |

FOREIGN PATENT DOCUMENTS

| | | |
|---|---|---|
| JP | H08-315269 A | 11/1996 |
| JP | H11-351721 A | 12/1999 |
| JP | 2005-140409 A | 6/2005 |
| JP | 2006-517497 A | 7/2006 |
| JP | 2008-292341 A | 12/2008 |
| JP | 2009-046198 A | 3/2009 |
| JP | 2009-544263 A | 12/2009 |

OTHER PUBLICATIONS

Japanese Office Action, Notification of Reasons for Refusal, dated Mar. 7, 2017 for Application No. JP 2016-515253, 4 pgs.
Office Action for European Patent Application Serial No. EP 13 739 303.9, dated Sep. 5, 2017.

* cited by examiner

AUTOMATIC SHUTDOWN SYSTEMS FOR REFRIGERATED CARGO CONTAINERS

CROSS REFERENCE TO RELATED APPLICATION

The present invention hereby claims the benefit of the provisional patent application Ser. No. 61/653,702, filed May 31, 2012, the disclosure of which is hereby incorporated by reference in its entirety.

TECHNICAL FIELD

The disclosure is directed to automatic shutdown systems for use with refrigerated air cargo containers comprising a refrigeration system, which may in turn comprise at least one exhaust fan. One or more sensors may be located in and/or on the air cargo containers such that when a fire signature and/or air transit is detected by the one or more sensors, the shutdown system may automatically do one or more of the following: turn off the at least one exhaust fan; restrict the airflow from the at least one exhaust fan; and/or turn the refrigeration system off.

BACKGROUND

In the airline industry, temperature-controlled cargo containers are utilized to ship temperature sensitive items, for example, blood, plasma and vaccines. The interior temperature of the cargo container is maintained using a refrigeration system. Refrigeration systems typically comprise a refrigeration compressor, a refrigeration condenser, and exhaust fans.

Exhaust fans may operate to remove heat from the interior of a refrigerated cargo container such as for example, by directing airflow over a condenser and exhausting the air to the external environment. Under normal operating conditions, the external direction of airflow is not an issue. However, when transported onboard an airplane, the flow of exhaust air and/or heat from the refrigerated cargo container may impair the ability of the airplane's smoke detection system to detect a smoke event and to alert the crew of an emergency. Further, in the event that an airplane's fire suppression system is activated, air currents generated by exhaust airflow from a refrigerated cargo container may impact the dispersal of the fire suppression agent, for example by changing the agent's concentration levels and therefore, its knockdown capabilities.

Since fires and the threat posed by them develop rapidly, the earliest possible warning of the outbreak of a fire is desired so that appropriate actions may be taken to mitigate damage. Thus it is vital to quickly detect the changes in the local environment of a fire. These changes may be referred to as fire signatures. Once produced by a fire, fire signatures must travel to a detector to produce a response, such as an alert.

The balance between early warning and minimum false alarms requires that sensors be selected to match their applications in terms of the characteristics of expected fires in the operating environment. An analysis of combustible materials and potential ignition sources aboard an airplane can provide insight into the expected fire signatures that will be produced.

Currently, cargo containers comprise smoke, relative humidity, temperature and/or particulate detectors which can reduce the speed of, or shutdown a container's exhaust fans when fire or smoke is detected. Yet an infinite combination of combustibles, flammable liquids and/or electrical equipment may be present in the cargo hold of an airplane on any given flight. It stands to reason that a fire in an airplane may produce fire signatures beyond those that are detectable by the aforementioned detectors at the initiation of a fire.

Thus, there is a need to have a shutdown system for use with a refrigerated cargo container that can quickly respond to a variety of fires and shutdown or restrict the container's exhaust airflow. There is also a need for a system that proactively shuts down or restricts the exhaust airflow when air transit is detected. Moreover, a shutdown system that minimizes false alarms is desired. Additionally, there is a need for a shutdown system that does not require a user to initiate the shutdown or restriction of the container's exhaust airflow.

SUMMARY

The unique solution that addresses the aforementioned needs may be employed in lieu of, or in conjunction with, one or more smoke detectors, particulate detectors, temperature sensors and relative humidity sensors, to automatically shut down or limit the power to the exhaust fans of a refrigerated cargo container in the event of a fire or air transit.

The present disclosure is directed to two new automatic shutdown systems, an active shutdown system and a passive shutdown system. The active shutdown system monitors for fire signatures, whereas the passive shutdown system monitors for air transit. These systems, which are discussed in detail below, can be used alone or in combination. Advantageously, these systems are "automatic," meaning that no instructions, intervention, or action from direct human contact, or via a remote signal, are required for the shutdown systems to operate.

The new automatic shutdown systems provide increased sensitivity to a wider variety of fire signatures and/or proactive management of the refrigerated cargo container's exhaust fans, so that fire damage may be mitigated.

The active shutdown systems provide the additional advantage of detecting a variety of fire signatures such that fires arising from varying sources and combinations thereof may be detected. Moreover, by utilizing a number of sensors that detect different fire signatures, the active shutdown systems may reduce false alarms.

The passive shutdown systems provide the additional advantage of being able to shut down the exhaust fans or to reduce the outflow of air prior to or during flight. These systems may be particularly useful for shipping cargo that can withstand the refrigeration unit either being turned off for the duration of a flight or being allowed to operate with restricted performance.

In some embodiments of the present disclosure, a refrigerated cargo container comprises an automatic shutdown system that may be active, passive or a combination thereof. In embodiments comprising a combination of both active and passive shutdown systems, the automatic shutdown system comprises a sensor selected from the group of: a thermal imagery sensor; a gas sensor; an accelerometer; a light intensity sensor; an altimeter; a frequency sensor; an electrical signal noise sensor; a transponder signal receiver; a global positioning system; and combinations thereof. The automatic shutdown system further comprises a controller. The sensor is communicably attached to the controller, which is in turn, communicably attached to at least one of the exhaust fans that forms a part of the container's refrigeration system. In addition, or in the alternative, the controller may be communicably attached to at least one air restrictor. The controller is arranged to automatically stop or automatically restrict airflow from the exhaust fan of the refrigeration system.

In some embodiments of the present disclosure, a refrigerated cargo container comprises an active shutdown system. The active shutdown system may comprise one or more sensors in addition to, or in lieu of: a smoke detector; a particulate detector; a temperature sensor; a relative humidity sensor; and combinations thereof. The active shutdown system may comprise sensors selected from the group of: a thermal imagery sensor; a gas sensor; a light intensity sensor; and combinations thereof. The shutdown system further comprises a controller. The sensor is communicably attached to the controller, which is in turn, communicably attached to at least one of the exhaust fans that forms a part of the container's refrigeration system. In addition, or in the alternative, the controller may be communicably attached to at least one air restrictor. The controller is arranged to automatically stop or automatically restrict airflow from the exhaust fan of the refrigeration system.

In some embodiments of the present disclosure, a refrigerated cargo container comprises a passive shutdown system. The shutdown system comprises a sensor selected from the group of: an accelerometer; an altimeter; a frequency sensor; an electrical signal noise sensor; a transponder signal receiver; a global positioning system; and combinations thereof. The shutdown system further comprises a controller. The sensor is communicably attached to the controller, which is in turn, communicably attached to at least one of the exhaust fans that forms a part of the container's refrigeration system. In addition, or in the alternative, the controller may be communicably attached to at least one air restrictor. The controller is arranged to automatically stop or automatically restrict airflow from the exhaust fan of the refrigeration system.

In some embodiments of the present disclosure, an automatic method for controlling the operation of the refrigeration system of a refrigerated cargo container is provided. The refrigeration system comprises exhaust fans. When a sensor located in, on, or in connection with the container determines that air transit is occurring, the sensor sends a signal to a controller. The controller automatically restricts performance of the refrigeration system such as by automatically stopping or automatically restricting airflow from the exhaust fan. In some embodiments, this is achieved by cutting power to the refrigeration system, by cutting power to individual circuits which power the exhaust fan(s).

In some embodiments of the present disclosure, the automatic method may further comprise the steps of a sensor detecting the change in altitude associated with an airplane takeoff or landing and communicating detection of the change in altitude to the controller. The controller then automatically restores performance of the refrigeration system such as by automatically increasing or automatically redirecting airflow from the exhaust fan to the outside of the container.

DETAILED DESCRIPTION

The terms "sensor" and "detector" are used interchangeably herein to refer to devices that detect parameters that may be associated with a fire or air transit.

The term "air transit" as used herein encompasses all phases of transport aboard an airplane including, loading onto the plane, takeoff, flight, landing and off-loading from the plane.

The term "fire signature" as used herein refers to one or more changes in the local environment of a fire. Fire signatures include, but are not limited to: smoke; change in temperature; change in light; particulate matter; change in energy; and combinations thereof.

The phrase "in connection with" as used herein in relation to a sensor means that the sensor may be disposed in an area that is remote from, i.e., not in or on, the refrigerated cargo container.

The terms "restrictor" or "restricts" as used herein refer to cessation, reduction or redirection of the airflow associated with at least one of the refrigeration system exhaust fans.

The term "airflow" as used herein may include the flow of air and/or heat.

The elements or features of the various embodiments are described in detail hereinafter. Any reference to a singular characteristic or limitation of the present disclosure shall include the corresponding plural characteristics or limitations, and vice versa, unless otherwise specified or clearly implied to the contrary by the context in which the reference is made.

The system and methods described herein may comprise, consist of, or consist essentially of the elements and features of the disclosure described herein, as well as any additional or optional components, or features described herein or otherwise useful in a refrigerated cargo container safety system.

All documents (patents, patent applications and other publications) cited in this application are incorporated herein by reference in their entirety to the extent that they are not inconsistent with the disclosure set forth herein.

The shutdown systems of the present disclosure are deployed on, in and/or in connection with a refrigerated cargo container. The shutdown systems may be active or passive and may comprise one or more sensors and a controller.

Refrigerated Cargo Container

Figure 1:
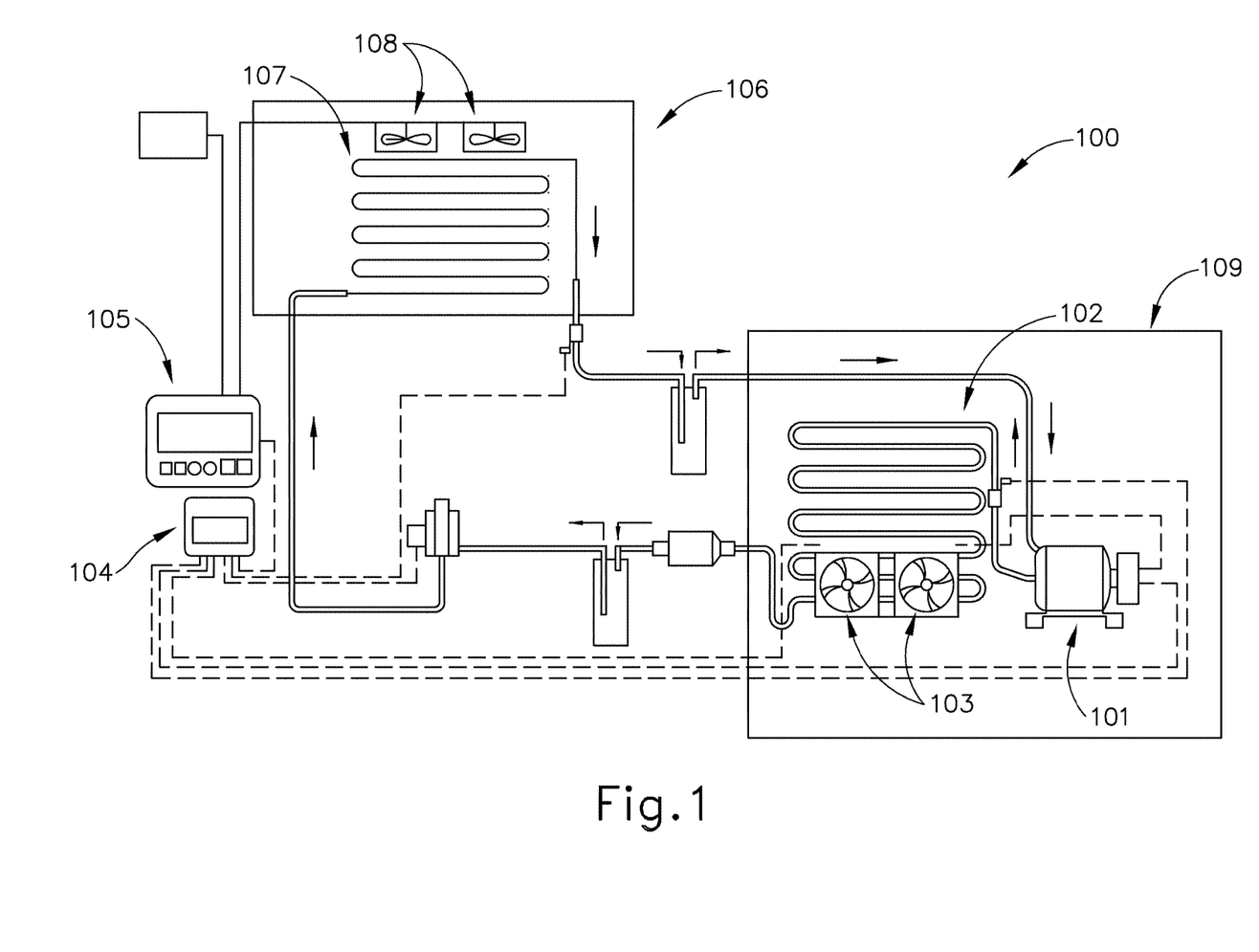
FIG. 1 is a schematic diagram showing an exemplary refrigeration system.

Refrigerated cargo containers comprise a refrigeration system. FIG. 1 is a schematic representation of a typical refrigeration system 100. The depicted system comprises: a refrigeration compressor 101; a refrigeration condenser 102; condenser fans 103; a system controller 104; a user interface 105; a cold side compartment 106 for the product, which in turn comprises an evaporator 107 and internal fans 108; and a hot side compartment 109 with active components in ambient conditions, wherein the condenser fans 103 exhaust or vent air to the outside of the cargo container in which the refrigeration system is installed.

Figure 2:
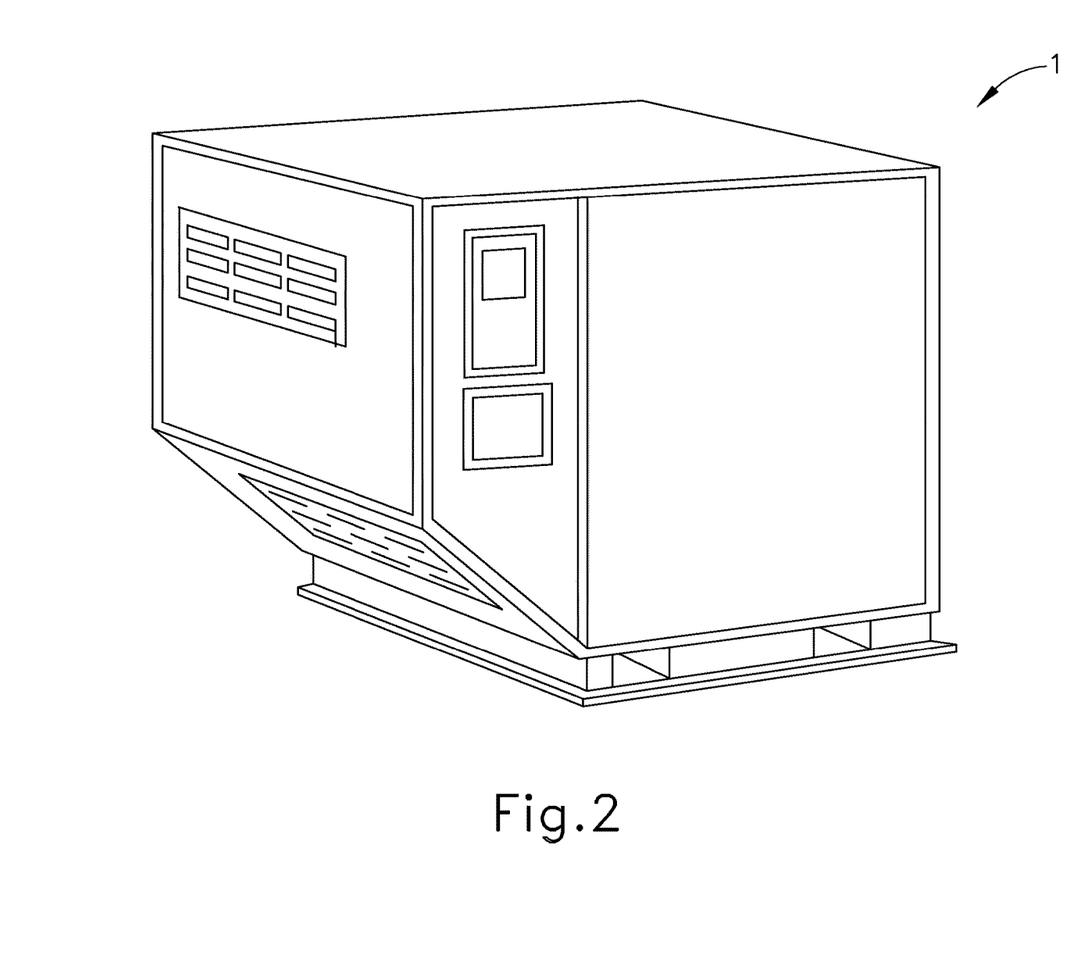
FIG. 2 is a schematic diagram showing an exemplary aircraft-configured cargo container.
Figure 3:
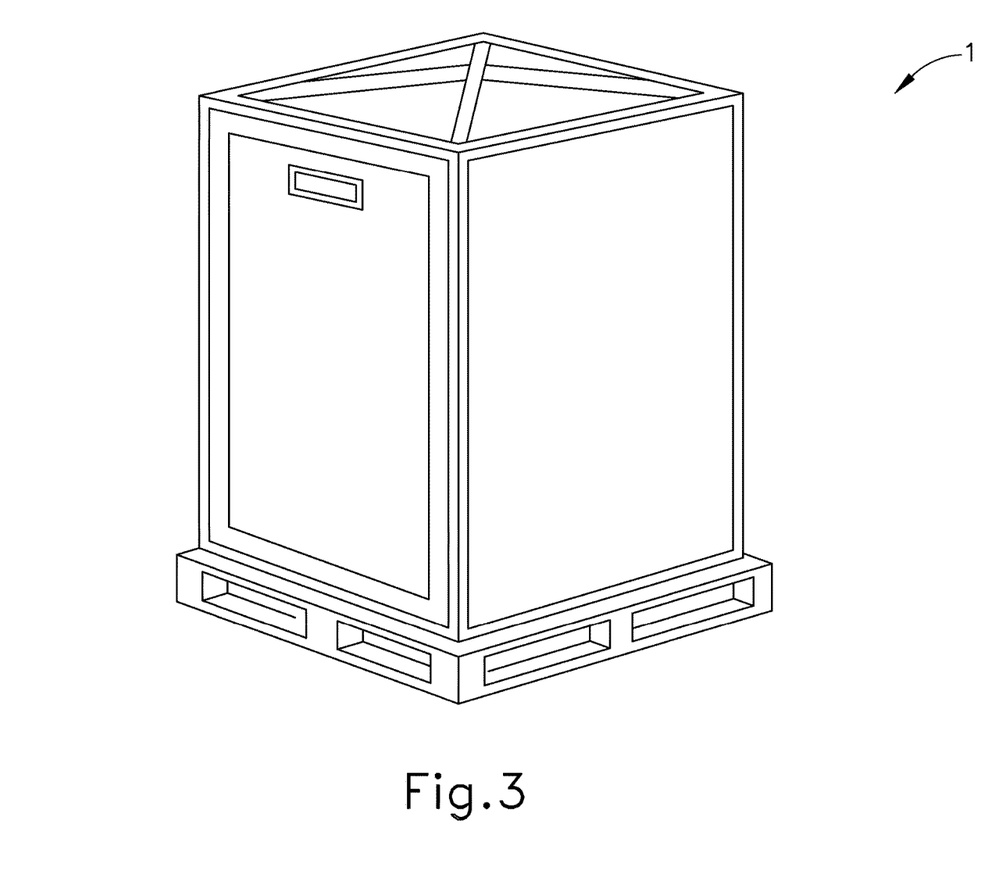
FIG. 3 is a schematic diagram showing an exemplary cargo-configured cargo container.

Refrigeration systems may be disposed within a cargo container in any manner that is suitable for keeping its contents within a desired temperature range. Non-limiting examples of cargo containers comprising refrigeration systems are disclosed in U.S. Pat. Nos. 7,913,511 and 7,263,855. The cargo container may take any form that is useful for transport aboard an airplane including, but not limited to, an aircraft-configured container 1 as shown in FIG. 2, or a cargo-configured container 1 as shown in FIG. 3.

Automatic Shutdown System

There are two types of automatic shutdown systems according to the present disclosure: an active shutdown system and a passive shutdown system. These systems may be utilized separately or in combination.

The active shutdown system remains operational for the duration of a flight. In the event that a fire signature is detected, the system automatically shuts down the exhaust fans, or automatically restricts the air flow from the exhaust fans of a refrigerated container for the remainder of the flight, or until the emergency has ended.

The passive shutdown system operates by automatically turning off the exhaust fans, or automatically restricting the air flow from the exhaust fans when air transit is sensed. The automatic shutdown may occur just prior to takeoff, during the loading of the refrigerated cargo container, or at an early stage in the flight. In some embodiments, the exhaust fans may be automatically reactivated or the airflow automatically restored to normal, when the end of air transit is sensed, for example, just prior to or during the unloading of the refrigerated cargo container from the airplane.

Figure 4:
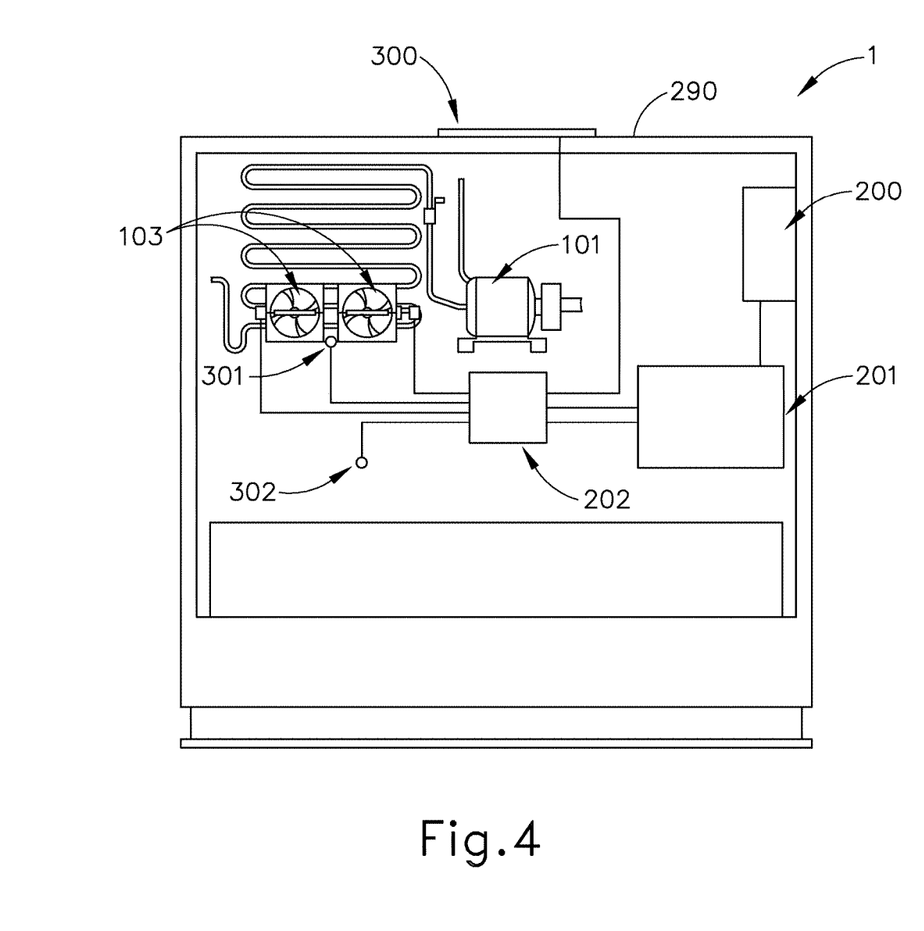
FIG. 4 is a schematic diagram of a cross-section of a refrigerated cargo container comprising a shutdown system.

The systems according to the present disclosure may use one or multiple types of sensors in varying quantities and positions with respect to the refrigerated cargo container. The sensors may be mounted on and/or in the refrigerated cargo container in any useful way. For example, sensors which detect fire signatures may be mounted on the cargo container so that they are in communication with the exterior of the container. These sensors monitor the ambient condition around the perimeter of the refrigerated cargo container during transit. In lieu of, or in addition to, sensors may be mounted in locations in communication with the interior of the cargo container such that they may monitor the ambient conditions inside of the container. The sensors may be in close proximity to the fans or airflow. Non-limiting examples of such locations include in vents or air ducts FIG. 4 is a schematic of a vertical section through an exemplary refrigerated cargo container comprising an active shutdown system. A sensor 300 is externally placed on the top 290 of the container 1 such that it can sample the environment outside of the container. Further sensors 301, 302 are disposed on the inside of the refrigerated cargo container where they can sample for fire signatures within the container. One of the sensors, 301, is disposed near the condenser exhaust fans 103 which drive air from the inside of the container.

Data captured by the sensors is outputted to a controller. If a fire signature is detected or if air transit is detected, the controller automatically shuts down the exhaust fans or automatically restricts the airflow output. Typically, this can be achieved by removing power to the fans, turning off the refrigeration system (for example by cutting power), turning off power to certain circuits which power the exhaust fans, or by closing or restricting the exhaust duct or vent airflow.

Active Flight Mode System Sensors

The active flight mode system may comprise any useful sensor for detecting fire signatures. In some embodiments of the disclosure, one or more of the sensors described below may be used in addition to, or in lieu of: a smoke detector; a particulate detector; a temperature sensor; a relative humidity sensor; and combinations thereof. The use of sensors is not intended to be limited to measuring fire signatures outside of the container. But rather, sensors may be present in communication with the inside of a refrigerated cargo container to monitor fires that could occur within the container's interior.

The refrigerated cargo container's exhaust fans can operate safely until such time as a sensor detects a fire signature. When one or more of the sensors detect a fire signature (e.g., infrared radiation, elevated temperature, etc.), the sensor may send a signal to the controller that automatically triggers the shutdown of the exhaust fan(s), or automatically restricts the air flow from the exhaust fan(s). To minimize false alarms, the controller may be programmed to act only when two or more sensors detect a fire signature in unison.

Non-limiting examples of useful sensors are selected from the group of: a thermal imagery sensor; a temperature sensor; a gas sensor; a light intensity sensor; a smoke and/or particulate detector; and combinations thereof.

A thermal imagery sensor utilizes a thermographic camera to monitor for infrared emissions, such as hot spots and/or radiant energy that are indicative of a fire. Any suitable type of thermal imagery sensor may be used. Non-limiting examples of thermal imagery sensor types include: spark detectors; flame detectors; infrared (IR) black body heat emission detectors; and combinations thereof. The disclosed shutdown systems may comprise any one or more of these thermal imagery sensors. Useful thermal imagery sensors include the FLIR Compact A-Series thermal camera, which is available from FLIR Systems (Boston, Mass.).

Flame detectors operate to monitor the area outside and/or inside of the refrigerated cargo container. Any suitable type of flame detector may be used. Non-limiting examples of useful types of flame detectors include: ultraviolet detectors; near IR array detectors; infrared detectors; UV/IR detectors; IR/IR detectors; IR3 detectors; visible detectors; ionization current flame detectors; and thermocouple flame detectors. A non-limiting example of a useful ultraviolet flame detector is the HF-24 Ultraviolet Flame Detector, which is available from Hochiki America Corporation (Buena Park, Calif.).

A temperature sensor utilizes a temperature probe to monitor the ambient temperature outside and/or inside of the refrigerated cargo container. Non-limiting examples of temperature sensors include: fixed-temperature detectors; thermoelectric detectors; detectors that sense the rate in rise of temperature; and combinations thereof. Useful temperature sensors include the Thermistor Probe, which is available from U.S. Sensor Corp. (Orange, Calif.), the DFE 135/190 Fixed Temperature Heat Detector and the DCD-135-190 Fixed Temperature/Rate of Rise Detector, each of which is available from Hochiki America Corporation (Buena Park, Calif.).

A gas sensor utilizes a meter to monitor the ambient concentrations of gas that is present outside and/or inside of the refrigerated cargo container. Non-limiting examples of a gas sensor may be selected from the group of: oxygen sensors; carbon monoxide sensors; and combinations thereof. Useful oxygen sensors include XYA oxygen sensors which are available from Sensortechnics, Inc. (Mansfield, Mass.). A useful carbon monoxide detector is the Kidde KN-COB-IC Hardwire Carbon Monoxide Alarm, which is available from Kidde Fire Safety (Meban, N.C.).

A light intensity sensor, including but not limited to, an ultraviolet (UV) detector, may utilize a camera to monitor the ambient light outside and/or inside of the refrigerated cargo container. UV detectors are sensitive to most fires, including those involving hydrocarbons, metals, sulfur, hydrogen, hydrazine and ammonia. When light level that is indicative of a fire is detected, the light intensity sensor sends a signal to the controller which automatically triggers the shutdown of the exhaust fans, or automatically restricts the airflow output. Non-limiting examples of useful light intensity sensors include the following series of photo controls from Intermatic, Inc. (Spring Grove, Ill.): K1100, K1200, K4000C, K4100, K4400, K4200, K4500, LC4500 and LC2000.

A smoke and/or particulate detector operates to monitor the area outside and/or inside of the refrigerated cargo container. Non-limiting examples of smoke detectors include: ionization detectors; photoelectric detectors; and combinations thereof. Smoke detectors operating photoelectrically may provide a faster response to signals indicative of low energy fires (smoldering fires) as these first generally produce large quantities of visible (larger particle) smoke. Smoke detectors operating under the ionization principle typically provide a faster response to fires of high energy (open flames) as these fires provide for smaller smoke particles that are more easily detected by this type of detector. Non-limiting examples of useful smoke and/or particulate detectors include the Direct-Wire Photoelectric Heat Smoke detector and the SLR-24H Photoelectric/Heat Smoke detector, each of which is available from Hochiki America Corporation (Buena Park, Calif.).

Passive Flight Mode System Sensors

Passive flight mode sensors monitor key conditions in relation to the container during air transit. When parameters are detected which indicate that the container is about to or has just entered air transit, the data from the device is outputted to a controller. The controller then automatically shuts down the exhaust fans, or automatically restricts the airflow output. Typically, this can be achieved by removing power to the fans, turning off the refrigeration unit or by closing, or otherwise restricting the exhaust duct or vent airflow.

In some embodiments, if parameters are detected that indicate a flight is near completion or is completed, the controller may automatically turn the exhaust fans back on or increase the airflow output. Typically, this can be achieved by directing power to the exhaust fans, turning the refrigeration unit on, or by opening or by otherwise facilitating an increase in the airflow output.

Any of the following sensors may be used alone or in combination with other passive flight mode sensors and/or active flight mode sensors. Passive flight mode sensor(s) may be selected from the group of: accelerometers; altimeters; frequency/electric noise sensors; transponder signal receivers; global positioning systems (GPS); and combinations thereof.

An accelerometer monitors the speed and acceleration forces that are associated with airplane takeoff. If takeoff is detected, the accelerometer sends a message to the controller which automatically shuts down the exhaust fans or automatically restricts the airflow output. In some embodiments, the accelerometer may be used to detect speed and deceleration forces that are associated with an airplane landing. If landing is detected, the accelerometer sends a message to the controller to automatically reactivate the exhaust fans or to return the airflow output to a desired level. Non-limiting examples of useful accelerometers include the ACC793 Accelerometer, which is available from Omega Engineering, Inc. (Stamford, Conn.).

An altimeter monitors the altitudes that are associated with airplane takeoff and landing. When takeoff is detected, the altimeter sends a message to the controller, which will then shut down the exhaust fans or restrict airflow output. When landing is detected, the altimeter may send a signal to the controller which will then automatically reactivate the exhaust fans when altitudes associated with an airplane landing are detected. Non-limiting examples of useful altimeters include the NS5611-01BA03 Pressure Sensor which is available from Measurement Specialties (Hampton, Va.).

A frequency and/or electrical signal noise detector scans for the presence of electrical frequencies or electrical signal noise associated with airplane systems. The frequency and/or electrical signal noise detector may comprise detection circuits that monitor the electrical frequencies or noise via an antenna. When these signals are detected in close proximity, the controller may automatically shut down the exhaust fans or automatically restrict the exhaust airflow until the electrical frequencies or electrical signal noise is no longer detected. In some embodiments, if the detector no longer detects electrical frequencies or electrical signal noise, the exhaust fans may be automatically reactivated or the exhaust airflow automatically returned to normal output.

A transponder signal receiver monitors for the presence of a transponder signal associated with an airplane or an air traffic control tower. In some embodiments, detection circuits monitor an ADS-B transponder via an antenna for signals, broadcasts and/or transmissions that are either: assigned to the aircraft in which the cargo container is located, or is to be transported; and/or assigned to the airport facility. When one or more of these signals is detected and is in close proximity, the exhaust fans will be automatically shut down or the exhaust restricted until the signal(s) are no longer detected. In some embodiments, the exhaust fans may then be automatically reactivated or the exhaust airflow automatically returned to normal output.

A GPS may be used to track the location of the refrigerated cargo container relative to key locations including, but not limited to airports. Moreover, the GPS may be used to calculate the movement and/or speed profiles of a plane that is in motion. Based on the findings of the GPS, the controller will automatically shut down the exhaust fans or restrict the exhaust airflow until the transponder signal is no longer detected. In some embodiments, the exhaust fans will be automatically reactivated or the exhaust airflow will be automatically returned to normal when the GPS detects that the refrigerated cargo container has reached its destination. Non-limiting examples of useful GPS include the GL200-Tracker with EMM Probe, which is available from 7PSolutions, LLC. (Brownsburg, Ind.).

Controller

The controller receives signals from sensor(s) to determine if a fire signature is present inside or outside of the refrigerated cargo container and/or to determine whether air transit is taking place. Once the signal is received and understood, the protocols within the controller will automatically perform a shutdown of one or more functions of the refrigeration system to restrict airflow from the container. Referring to FIG. 4, the controller may be present in the cargo container as an independent system 200, it may be incorporated into the container's power distribution/management system 201, or it may be incorporated into the container's active temperature control management system 202.

The shutdown methodology may be as follows. When the controller receives a signal indicating a parameter that may be related to fire or air transit, the controller will automatically perform functions that will stop or restrict the outgoing airflow from the container; this function can be performed in many ways and in many combinations. In some embodiments, airflow is prevented from leaving the container by valves inside the ducting or vents that stop or redirect the airflow. In some embodiments, airflow is turned off or the airflow rate is restricted by limiting the power supplied to the exhaust fan(s) thereby reducing the speed of the exhaust fan(s). In some embodiments, the controller shuts down the refrigeration system. In some embodiments, airflow direction is reversed to prevent the air from leaving the container by reversing the polarity of the power supplied to the fans.

Figure 5:
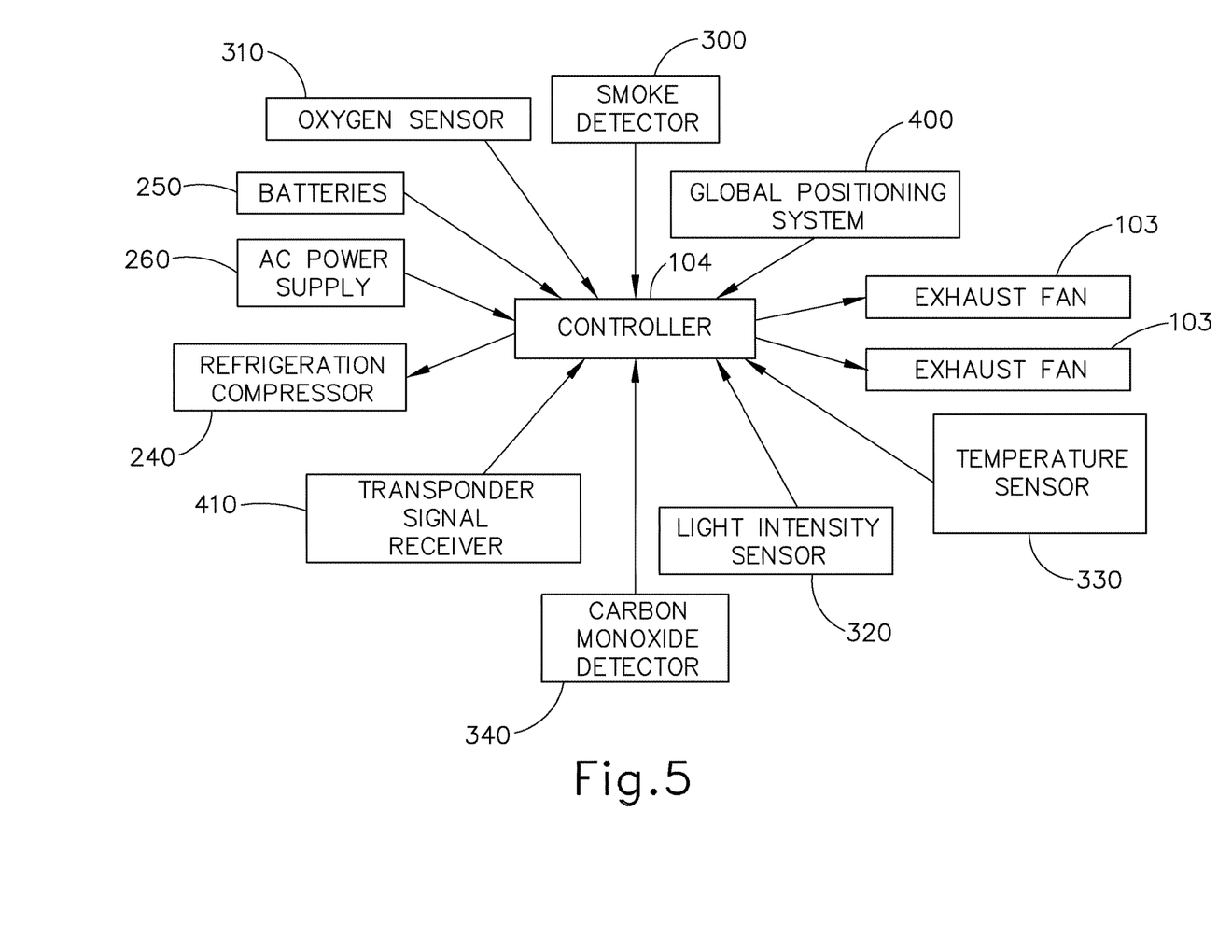
FIG. 5 is a block diagram of the electrical components of a shutdown system for a refrigerated cargo container.

The shutdown system may comprise any useful configuration. FIG. 5 shows a block diagram of a combined active and passive shutdown system. Active shutdown sensors including a smoke detector 300, an oxygen sensor 310, and light intensity sensor 320, a temperature sensor 330, and a carbon monoxide detector 340, each of which are connected to the controller 104. Additionally, passive shutdown sensors including a GPS 400 and a transponder signal receiver 410 are also connected to the controller 104. The controller 104 in turn is connected to the container power supplies, i.e., batteries 250 and an AC power supply 260. The controller 104 is also connected to the refrigeration compressor 240. If a fire signature and/or air transit is detected, then the controller 104 may automatically shut down the exhaust fans 103. In addition, or in the alternative, the controller 104 may automatically cut the power to the refrigeration compressor 240. Given that this embodiment comprises an active and a passive shutdown system, its user has the flexibility of determining which system is the most appropriate to use for that particular shipment of cargo. Appropriateness may be determined by factors including how long the refrigerated cargo container can maintain a desired temperature without power to the refrigeration compressor.

Figure 6:
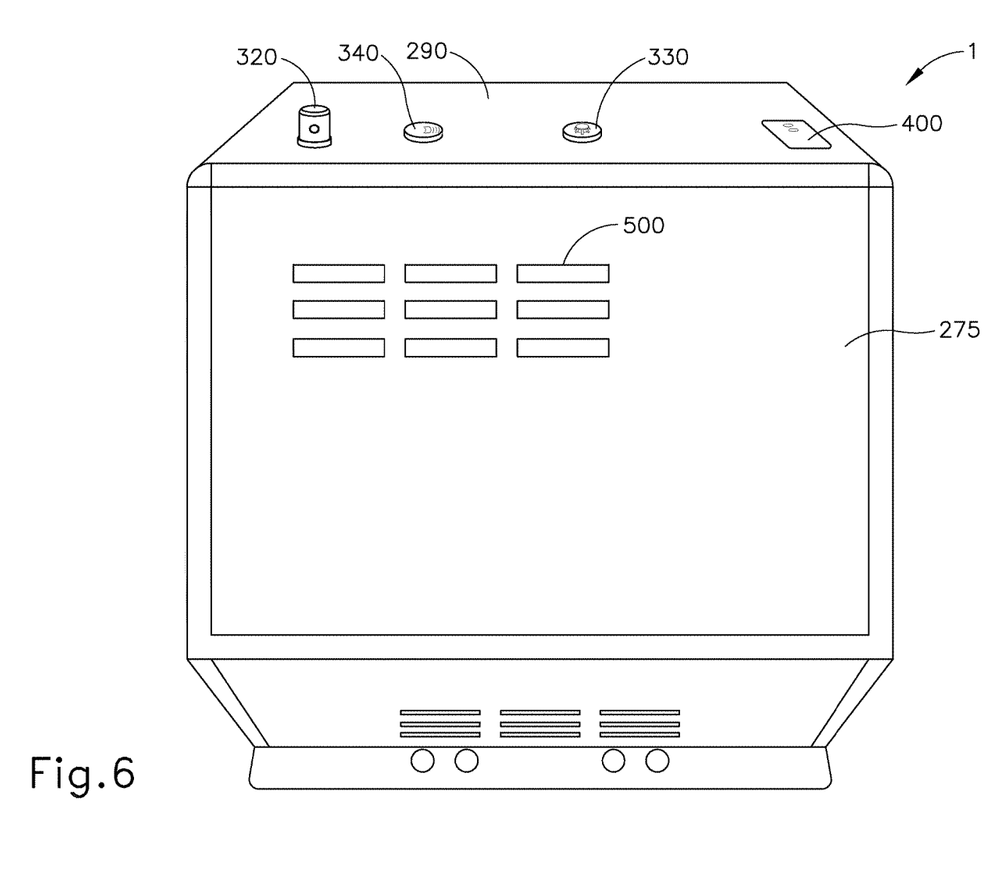
FIG. 6 is a rear, outside perspective view of an embodiment of a refrigerated cargo container comprising the electrical components of the shutdown system depicted in FIG. 5.

FIG. 6 is a rear, outside perspective view of an embodiment of a refrigerated cargo container 1 comprising the combined active and passive shutdown system depicted in FIG. 5. Vent slots 500 in a removable rear panel 275 correspond to where the condenser exhaust fans (not shown) are located interior to the removable panel 275.

Figure 7:
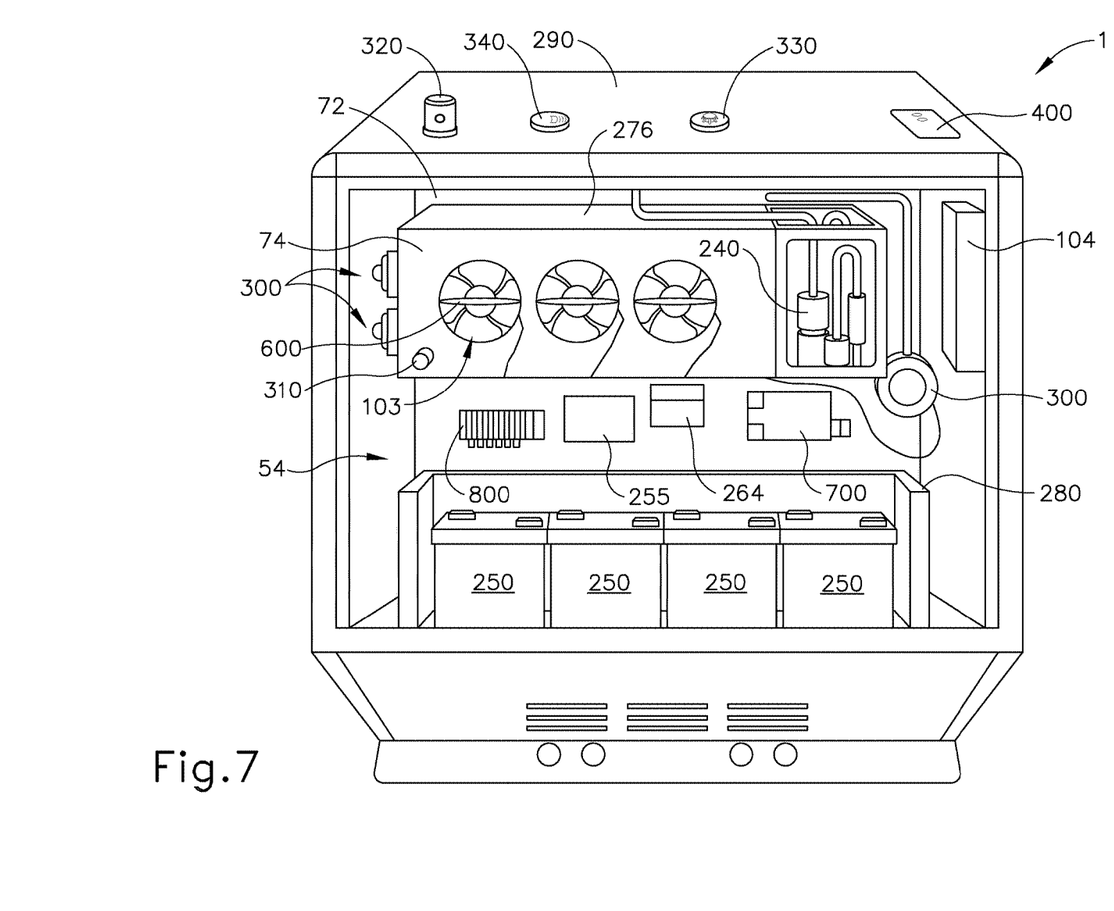
FIG. 7 is a rear, outside perspective view of the embodiment of the refrigerated cargo container shown in FIG. 6, with the removable rear panel removed from the cargo container.

FIG. 7 is a rear, outside perspective view of the embodiment of FIG. 6, with the removable rear panel removed from the cargo container 1. An elongated fiber reinforced box-like support 74 is attached or bonded to the rear wall 72 of the outer shell 54 of the container and is enclosed by a second removable rear panel 276. A set of three refrigeration condenser exhaust fans 103 is supported by the box-like support 74. A restrictor valve 600 is located on each of the exhaust fans 103. A battery charger 264 is mounted on the rear wall 72 and is connected to a universal AC voltage supply 255. A motor driven refrigeration compressor 240 is mounted on the upper wall of the rectangular projection 74 and is connected to the internal and external DC power source through a compressor controller 800 that is located in the interior of the cargo container. A power distributer 700 is located in the interior of the cargo container. Another box-like support 280 is also attached or bonded to the rear wall 72 of the outer shell 54 and is also constructed from fiber reinforced composite panels, as disclosed in U.S. Pat. No. 6,740,381. The support 280 has an open top and is opened at the rear for receiving and supporting the storage batteries 250.

The support 74 and the rear wall 72 of the outer shell 54 also support the smoke detectors 300 and the oxygen sensor 310. Portions of the following sensors may be seen extending from or mounted flush with the roof 290 of the cargo container: a light intensity detector 320, a fixed temperature/rate in rise temperature sensor 330, a carbon monoxide detector 340 and a GPS 400. A transponder signal receiver is included in this embodiment (not shown). In the event that any of the sensors detect a fire signature or air transit, the controller shuts down the exhaust fans.

Method

In some embodiments, the present disclosure is directed to a method of automatically controlling the operation of the exhaust fan of a refrigerated cargo container. The method may utilize a passive shutdown system, an active shutdown system or combinations thereof.

In embodiments utilizing a passive shutdown system, the method may be as follows. A sensor detects air transit of the refrigerated cargo container. Air transit is indicated by one or more flight phases. Flight phases may include: bringing the refrigerated cargo container to the airport; loading the refrigerated cargo container onto an airplane; airplane takeoff; airplane landing; offloading of the refrigerated cargo container from the airplane; and/or removing the refrigerated cargo container from the airport.

Sensors that may be utilized to detect air transit are discussed in detail above. Useful sensors may be selected from the group of: accelerometers; altimeters; frequency sensors; electric signal noise sensors; transponder signal receivers; global positioning systems; and combinations thereof.

Once the sensor communicates the detection of air transit to the controller, the controller will automatically perform functions that will stop or restrict the outgoing airflow from the container; this function can be performed in many ways and in many combinations. In some embodiments, airflow is prevented from leaving the container by valves, such as butterfly valves, inside the ducting or vents that stop or redirect the airflow. In some embodiments, airflow is turned off or the airflow rate is restricted by limiting the power supplied to the exhaust fan(s) thereby reducing the speed of the exhaust fan(s). In some embodiments, the controller shuts down the refrigeration system. In some embodiments, airflow direction is reversed to prevent the air from leaving the container by reversing the polarity of the power supplied to the fans.

In some embodiments, the method further comprises the step of the sensor detecting airplane landing or offloading of the refrigerated cargo container. The sensor communicates detection of either of these air transit phases to the controller. The controller will automatically perform functions that will replace, increase or redirect the outgoing airflow from the container; this function can be performed in many ways and in many combinations. For example, the airflow may be allowed to leave the container by opening valves inside the ducting or vents that allow or redirect the airflow. In some embodiments, airflow is turned on or the airflow rate is increased by increasing the power supplied to the exhaust fan(s) thereby increasing the speed of the exhaust fan(s). In some embodiments, the controller turns the refrigeration system on. In some embodiments, airflow direction is reversed to allow the air to leave the container by reversing the polarity of the power supplied to the fans.

In embodiments utilizing an active shutdown system, the method may be as follows. A sensor detects a fire signature. Fire signatures may include, but are not limited to: smoke;

change in temperature; change in light; particulate matter; change in energy; and combinations thereof.

Sensors that may be utilized to detect fire signatures are discussed in detail above. Non-limiting examples of useful sensors may be selected from the group of: a thermal imagery sensor; a temperature sensor; a gas sensor; a light intensity sensor; a smoke and/or particulate detector; and combinations thereof. In some embodiments of the disclosure, one or more of these sensors may be used in addition to, or in lieu of: a smoke detector; a particulate detector; a temperature sensor; a relative humidity sensor; and combinations thereof.

Once the sensor communicates the detection of a fire signature to the controller, the controller will automatically perform functions that will stop or restrict the outgoing airflow from the container; this function can be performed in many ways and in many combinations. In some embodiments, airflow is prevented from leaving the container by valves, such as butterfly valves, inside the ducting or vents that stop or redirect the airflow. In some embodiments, airflow is turned off or the airflow rate is restricted by limiting the power supplied to the exhaust fan(s) thereby reducing the speed of the exhaust fan(s). In some embodiments, the controller shuts down the refrigeration system. In some embodiments, airflow direction is reversed to prevent the air from leaving the container by reversing the polarity of the power supplied to the fans.

In embodiments utilizing a combination of an active and a passive shutdown system, the method may be as follows. Sensors of use in the method may include those that are utilized to detect fire signatures and air transit as discussed in detail above. One or more sensors detect a fire signature prior to or after air transit, i.e., when the exhaust fans and/or the refrigeration system are operating normally. Air transit is indicated by one or more flight phases. Flight phases may include: bringing the refrigerated cargo container to the airport; loading the refrigerated cargo container onto an airplane; airplane takeoff; airplane landing; offloading of the refrigerated cargo container from the airplane; and/or removing the refrigerated cargo container from the airport.

In embodiments in which a combination of an active and passive shutdown system are utilized, the controller is configured to automatically control the operation of the at least one exhaust fan in response to a fire signature and/or air transit.

Once the sensor communicates the detection of a fire signature to the controller, the controller will automatically perform functions that will stop or restrict the outgoing airflow from the container; this function can be performed in many ways and in many combinations. In some embodiments, airflow is prevented from leaving the container by valves, such as butterfly valves, inside the ducting or vents that stop or redirect the airflow. In some embodiments, airflow is turned off or the airflow rate is restricted by limiting the power supplied to the exhaust fan(s) thereby reducing the speed of the exhaust fan(s). In some embodiments, the controller shuts down the refrigeration system. In some embodiments, airflow direction is reversed to prevent the air from leaving the container by reversing the polarity of the power supplied to the fans.

What is claimed is:

1. An automatic shutdown system for a refrigerated cargo container, the system comprising:
    (a) a cargo container comprising a refrigeration system, wherein the refrigeration system comprises at least one exhaust fan; and
    (b) a first sensor selected from the group of: an accelerometer; a frequency sensor; an electrical signal noise sensor; a transponder signal receiver; and combinations thereof;
    wherein the first sensor is communicably attached to a controller which is communicably attached to the refrigeration system, and the controller is arranged to automatically stop or restrict airflow from the exhaust fan of the refrigeration system;
    wherein the controller is configured to automatically stop or restrict airflow from at least one exhaust fan in response to the detection of air transit by the first sensor; and wherein air transit is selected from the phases of: bringing the refrigerated cargo container to the airport; loading the refrigerated cargo container onto an airplane; airplane takeoff; flight; airplane landing; offloading of the refrigerated cargo container from an airplane; and removing the refrigerated cargo container from the airport.

2. The automatic shutdown system of claim 1, further comprising a second sensor selected from the group of: a thermal imagery sensor; a gas sensor; a light intensity sensor; a temperature sensor; a relative humidity sensor; a smoke sensor; a particulate sensor; and combinations thereof.

3. The automatic shutdown system of claim 2, wherein the controller is configured to automatically control the operation of the refrigeration system in response to the detection of a fire signature by the second sensor.

4. The automatic shutdown system of claim 3, wherein the controller is configured to automatically control the operation of the at least one exhaust fan.

5. The automatic shutdown system of claim 3, wherein the fire signature is selected from the group of: smoke; particulate matter; infrared emissions; hot spots; radiant energy; temperature; oxygen concentration; carbon monoxide concentration; ultraviolet light; and combinations thereof.

6. The automatic shutdown system of claim 1, wherein the first sensor is located on the exterior of the refrigerated cargo container.

7. The automatic shutdown system of claim 1, wherein the first sensor is located in the interior of the refrigerated cargo container.

8. An automatic shutdown system for a refrigerated cargo container, the system comprising:
    (a) a cargo container comprising a refrigeration system, wherein the refrigeration system comprises at least one exhaust fan;
    (b) a sensor located in an interior of the refrigerated cargo container, wherein the sensor is selected from the group of: an accelerometer; a frequency sensor; an electrical signal noise sensor; a transponder signal receiver; and combinations thereof; and
    (c) a controller;
    wherein the sensor is communicably attached to the controller which is communicably attached to the at least one exhaust fan, and the controller is arranged to automatically stop or restrict airflow from the at least one exhaust fan;
        wherein the controller is configured to automatically stop or restrict airflow from at least one exhaust fan in response to the detection of air transit by the sensor; and wherein air transit is selected from the phases of: bringing the refrigerated cargo container to the airport; loading the refrigerated cargo container onto an airplane; airplane takeoff; flight; airplane landing; offloading of the refrigerated cargo container from an airplane; and removing the refrigerated cargo container from the airport.

9. The automatic shutdown system of claim 8, further comprising a sensor selected from the group of: a thermal imagery sensor; a gas sensor; an accelerometer; a light intensity sensor; a temperature sensor; a relative humidity sensor; a smoke sensor; a particulate sensor; and combinations thereof.

10. An automatic shutdown system for a refrigerated cargo container, the system comprising:
(a) a cargo container comprising a refrigeration system, wherein the refrigeration system comprises at least one exhaust fan; and
(b) a first sensor selected from the group of: an accelerometer; a frequency sensor; an electrical signal noise sensor; a transponder signal receiver; a global positioning system; and combinations thereof;
wherein the first sensor is communicably attached to a controller which is communicably attached to the refrigeration system, and the controller is arranged to automatically stop or restrict airflow from the exhaust fan of the refrigeration system;
wherein the controller is configured to automatically stop airflow from at least one exhaust fan in response to the detection of: airplane takeoff, flight and airplane landing.

11. The automatic shutdown system of claim 10, further comprising a second sensor selected from the group of: a thermal imagery sensor; a gas sensor; a light intensity sensor; a temperature sensor; a relative humidity sensor; a smoke sensor; a particulate sensor; and combinations thereof.

12. The automatic shutdown system of claim 11, wherein the controller is configured to automatically control the operation of the refrigeration system in response to the detection of a fire signature by the second sensor.

13. The automatic shutdown system of claim 12, wherein the controller is configured to automatically control the operation of the at least one exhaust fan.

14. The automatic shutdown system of claim 12, wherein the fire signature is selected from the group of: smoke; particulate matter; infrared emissions; hot spots; radiant energy; temperature; oxygen concentration; carbon monoxide concentration; ultraviolet light; and combinations thereof.

15. The automatic shutdown system of claim 10, wherein the first sensor is located on the exterior of the refrigerated cargo container.

16. The automatic shutdown system of claim 10, wherein the first sensor is located in the interior of the refrigerated cargo container.

* * * * *